United States Patent [19]

Miyazaki et al.

[11] Patent Number: 5,212,535
[45] Date of Patent: May 18, 1993

[54] SPATIAL FILTER TYPE SPEED MEASURING APPARATUS

[75] Inventors: Hidenori Miyazaki, Takatsuki; Hiroshi Kitajima, Kyoto, both of Japan

[73] Assignee: Omron Corporation, Kyoto, Japan

[21] Appl. No.: 716,809

[22] Filed: Jun. 19, 1991

[30] Foreign Application Priority Data

Jun. 20, 1990 [JP] Japan .................. 2-163420

[51] Int. Cl.$^5$ .............. G01P 3/36; B60T 7/16
[52] U.S. Cl. ..................... 356/28; 180/169
[58] Field of Search ............. 356/28; 180/169

[56] References Cited

U.S. PATENT DOCUMENTS

| | | | |
|---|---|---|---|
| 3,486,032 | 12/1969 | Cufflin | 356/28 |
| 3,508,066 | 4/1970 | Agar | 356/28 |
| 4,333,008 | 6/1982 | Misek | 244/3.16 |
| 4,470,696 | 9/1984 | Ballard | 356/28 |
| 5,038,030 | 8/1991 | Hayashi et al. | 250/225 |

OTHER PUBLICATIONS

"Electronics", Ohm Publishing Co., Ltd., Jan. 1984, pp. 73-76.

Primary Examiner—Stephen C. Buczinski
Attorney, Agent, or Firm—Foley & Lardner

[57] ABSTRACT

A speed measuring apparatus includes a light projecting unit having a light source for emitting light, a projection optical system for projecting the light from the light source onto a relatively moving object and a first polarizer included in a part of the projection optical system for allowing the passage of polarized light from the light source as projected light. A light receiving unit includes a second polarizer allowing the passage of polarized light in a direction at right angles to the direction of polarization of the projected light reflected from the relatively moving object and a spatial filter detector for taking out a predetermined spatial frequency of the light passed through the second polarizer and outputting an electrical signal representing the frequency. The relative speed of the relatively moving object is calculated on the basis of the signal from the spatial filter detector.

10 Claims, 3 Drawing Sheets

SPATIAL FILTER TYPE SPEED MEASURING APPARATUS

BACKGROUND OF THE INVENTION

1. Field of the Invention

The present invention relates to a speed measuring apparatus using the principle of a spatial filter, for example, to a speed measuring apparatus used as a non-contact speed meter carried in a vehicle.

2. Description of the Prior Art

FIG. 5 shows the construction of a conventional spatial filter type speed measuring apparatus (see "Electronics", Ohm Publishing Co., Ltd., January, 1984, pp. 73 to 76).

The spatial filter type speed measuring apparatus has a light projecting unit (LPU) 1 and a light receiving unit (LRU) 2 which are fixed to a holder 10. This is mounted on an automobile or the like with the side on which light is emitted from the light projecting unit 1 and the side on which light impinges on the light receiving unit 2 being directed toward a road surface L.

The light projecting unit 1 has a concave reflecting mirror 13, a lamp (light source) 14 and an aspherical lens 15 contained in a case 11. It is so adapted that light emitted from the lamp 14 is both directly projected through the aspherical lens 15, and reflected from the concave reflecting mirror 13 and projected through the aspherical lens 15, onto the road surface L.

The light receiving unit 2 has an objective lens 27, a slit 28, a differential type spatial filter detector 22 and a differential amplifier 23 contained in a case 21. It is so adapted that light reflected from the road surface L converges on the the objective lens 27, and light passed through the slit 28 forms an image on the detector 22.

The differential type spatial filter detector 22 comprises a semiconductor substrate 30 and two comb-shaped photodiodes 31 and 32 formed on the substrate 30, as shown in FIG. 6. The photodiodes 31 and 32 are insulated from each other. The teeth or fingers of the comb-shaped photodiode 31 are alternately arranged with the teeth or fingers of the comb-shaped photodiode 32. Let P be the pitch between the teeth or fingers.

The difference between the level of an output signal of the photodiode 31 and the level of an output signal of the photodiode 32 is calculated by the differential amplifier 23. Let f be the frequency of an output signal of the differential amplifier 23, and K be the coefficient related to the image-forming magnification in an optical system of the light receiving unit 2. In this case, the speed V of a vehicle is generally given by the following equation:

$$V = K \cdot P \cdot f.$$

The road surface or the like includes grains of various sizes from one millimeter to several centimeters such as small stones, sand and asphalt and irregular patterns due to tire tracks, causing irregularities in reflection (color irregularities, surface irregularities or the like). The spatial filter type speed measuring apparatus is constructed so as to take a component of the signal due to the irregularities in reflection spaced at $\Delta$ (=about 2.3 millimeters) from the irregular patterns. More specifically, the output signal of the differential amplifier 23 turns into a pulse train by waveform shaping after passing through a band-pass filter. The pulses are counted by a counter. Since the pulses occur due to the irregularities in reflection spaced at $\Delta$, the speed V can be found by multiplying a counted value of pulses corresponding to one second by the value $\Delta$.

When the spatial filter type speed measuring apparatus of the above described construction is used as, for example, a speed meter carried in a vehicle while facing a road surface, however, there is a problem.

More specifically, if there is a puddle or the like on the road surface, most of light emitted from the light projecting unit is specularly reflected from the surface of the puddle and the light specularly reflected forms an image on the light receiving unit. Accordingly, the irregularities in reflection from the road surface at the bottom of the puddle cannot be detected, thereby making it impossible to measure the exact speed. Under bad conditions such as rainy weather, it is particularly difficult to measure the speed.

SUMMARY OF THE INVENTION

An object of the present invention is to provide a spatial filter type speed measuring apparatus capable of precisely detecting the speed even if there is a specularly reflecting object such as a puddle or a glass piece on a road surface or the like.

The spatial filter type speed measuring apparatus according to the present invention includes a light projecting unit for projecting light onto an object moving in relation to it, such as a road surface, and a light receiving unit for detecting light reflected from the above relatively moving object for measuring the speed using the principle of a spatial filter. The spatial filter type speed measuring apparatus includes a first polarizer disposed in a position from which light is emitted from the above light projecting unit and a second polarizer disposed in a position on which light impinges from the above light receiving unit. Thus, the direction of polarization thereof as viewed along an optical path of the light which is emitted from the above light projecting unit and reflected from the above relatively moving object to impinge on the above light receiving unit crosses at right angles to the direction of polarization of the first polarizer.

In the present invention, the first polarizer is disposed in the position from which light is emitted from the light projecting unit. Accordingly, light (natural light) emitted from the light projecting unit is transformed into linearly polarized light by the first polarizer, to be projected into the road surface. When there is a puddle or the like on the road surface, the light emitted from the light projecting unit is specularly reflected from the surface of the puddle while maintaining the direction of polarization. Accordingly, the light does not impinge on the light receiving unit through the second polarizer, and is not detected by the light receiving unit. On the other hand, light reflected from the road surface (the bottom of the puddle) after passing through water of the puddle is transformed into natural light (whose direction of polarization is random) due to irregular reflection, and a component thereof impinges on the light receiving unit through the second polarizer to form an image in the light receiving unit.

Consequently, even if there is a place from which light is specularly reflected, such as a puddle, on a road surface, the light specularly reflected can be prevented from impinging on the light receiving unit so that only the light reflected from the road surface forms an image, thereby making it possible to precisely measure the speed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
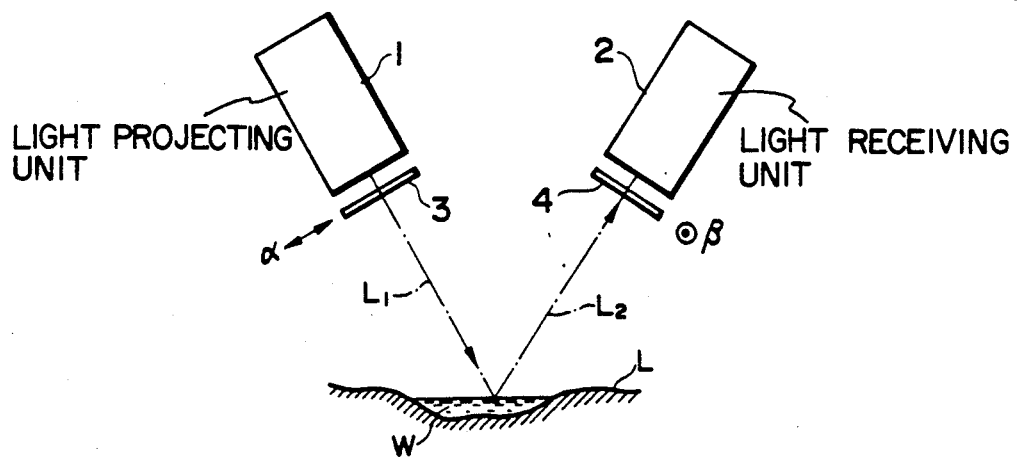
FIG. 1 is a diagram showing the arrangement and construction of an embodiment of the present invention.
Figure 5:
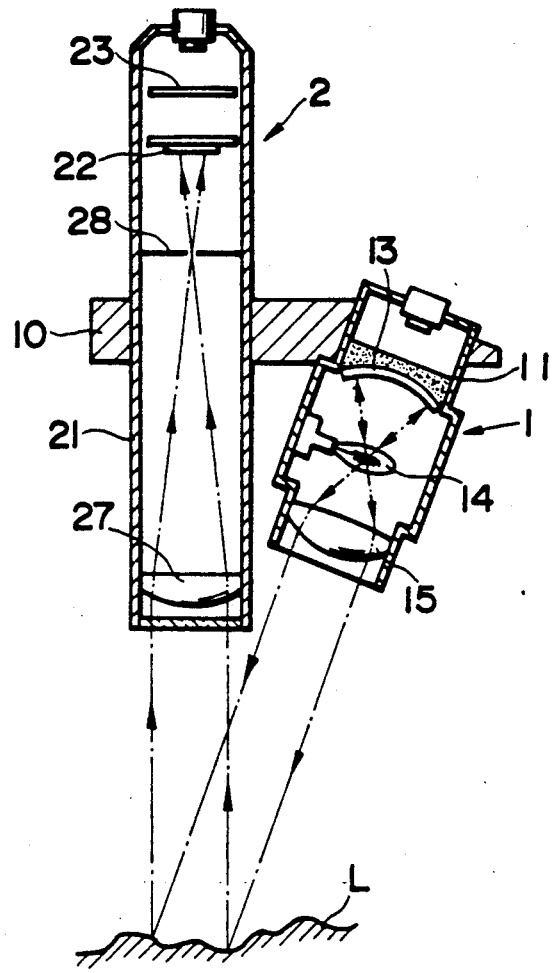
FIG. 5 is a cross sectional view showing structures of a light projecting unit and a light receiving unit in a conventional spatial filter type speed measuring apparatus.
Figure 6:
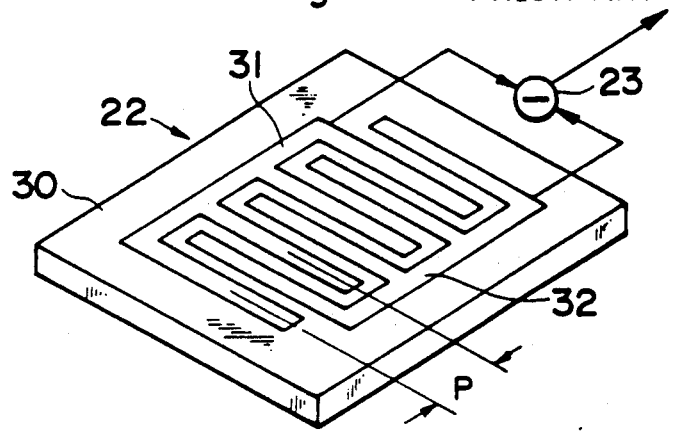
FIG. 6 is a perspective view showing a differential type spatial filter detector.

FIG. 1 is a schematic diagram showing one embodiment of the present invention. A light projecting unit 1 and a light receiving unit 2 respectively have the same structure as those already described (see FIG. 5).

A window through which light is emitted from the light projecting unit 1 or the front surface thereof is provided with a polarizing plate 3, and a window through which light impinges on the light receiving unit 2 or the front surface thereof is provided with a polarizing plate 4. The directions of polarization of both the polarizing plates 3 and 4 cross at right angles to each other. More specifically, when following an optical pass of light L1 and L2 which is emitted from the light projecting unit 1 and reflected from a road surface L to impinge on the light receiving unit 2, the direction α of polarization of the polarizing plate 3 and the direction β of polarization of the other polarizing plate 4 as viewed from the light L1 and L2 cross at right angles to each other. For example, as shown in FIG. 1, the direction α of polarization of the polarizing plate 3 is parallel to the surface including the projected light L1 and the reflected light L2 (in the direction parallel to paper of FIG. 1), and the direction β of polarization of the polarizing plate 4 is perpendicular to the surface including the projected light L1 and the reflected light L2 (in the direction perpendicular to paper of FIG. 1).

Therefore, the projected light which is natural light emitted from the light projecting unit 1 is transformed into linearly polarized light in the direction α by passing through the polarizing plate 3. When there is a puddle W on the road surface L opposite to the light projecting unit 1 and the light receiving unit 2, light specularly reflected from the surface of the puddle W travels as light polarized in a direction at right angles to the direction β while maintaining the direction of polarization. Consequently, the light specularly reflected from the surface of the puddle W is completely prevented from impinging on the light receiving unit 2 by the polarizing plate 4. On the other hand, light reflected from the road surface L at the bottom of the puddle W after passing through the puddle W is transformed into natural light whose direction of polarization is random again due to irregular reflection and travel to the polarizing plate 4 as the natural light. Consequently, a part of the light reflected from the road surface L can pass through the polarization plate 4 and impinge on the light receiving unit 2, to form an image on a detector 22.

Even when the puddle W exists on the road surface L, therefore, the light specularly reflected from the surface of the puddle W can be prevented from impinging on the light receiving unit 2 so that only the light reflected from the road surface L forms an image, thereby making it possible to precisely measure the speed.

Figure 2:
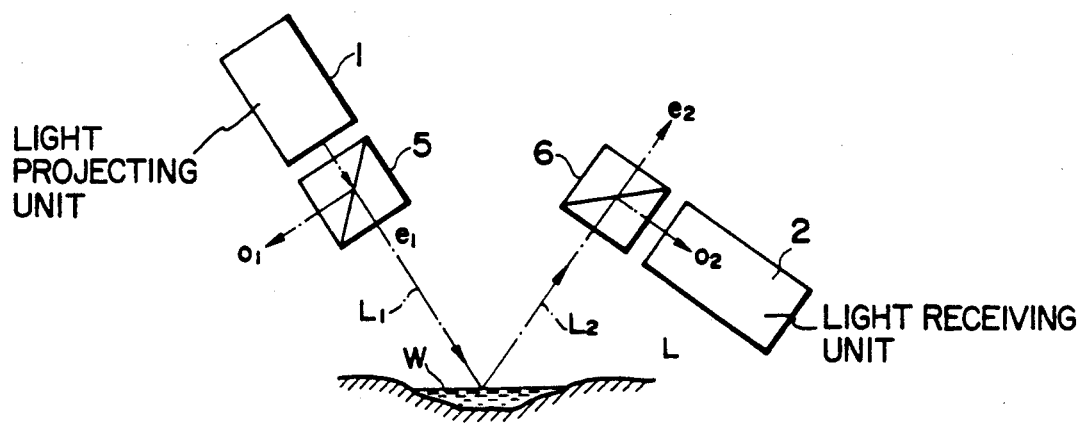
FIG. 2 is a diagram showing the arrangement and construction of another embodiment.

FIG. 2 shows an embodiment using polarization beam splitters 5 and 6 as polarizers. The polarization beam splitter is an optical element such as a Nicol prism for separating incident light into two polarized light whose directions of polarization cross at right angles to each other using a crystal having birefringent properties. For example, an extraordinary ray e (linearly polarized light) of the incident light is propagated in an almost straight line after passing through a joint surface of the crystal, while an ordinary ray o (linearly polarized light) thereof is reflected from the joint surface of the crystal, going out by changing its path almost perpendicularly. In the present embodiment, a light projecting unit 1 and the polarization beam splitter 5 are linearly arranged toward a road surface L along the optical axis of the emitted light, and a light receiving unit 2 is arranged in a direction at almost right angles to the direction of the optical axis of reflected light between the road surface L and the polarization beam splitter 6. Moreover, both the polarization beam splitters 5 and 6 are arranged so that the optical axes of the crystals coincide with each other, as viewed from respective incident light. Light polarized in a direction at right angles to light polarized by passing through the polarization beam splitter 5 is reflected from the polarization beam splitter 6, to impinge on the light receiving unit 2.

In the present embodiment, therefore, only an extraordinary ray $e_1$ of light emitted from the light projecting unit 1 is propagated in an almost straight line from the polarization beam splitter 5, to be projected onto the road surface L. At this time, light specularly reflected from a puddle W on the road surface L travels without changing the state of polarization. This reflected light is propagated in an almost straight line as an extraordinary ray $e_2$ in the second polarization beam splitter 6, and does not impinge on the light receiving unit 2. On the other hand, if the extraordinary ray $e_1$ passed through the polarization beam splitter 5 is reflected from the road surface L, the extraordinary ray $e_1$ is transformed into natural light again due to irregular reflection. Accordingly, if the reflected light impinges on the polarization beam splitter 6, the extraordinary ray $e_2$ is propagated in an almost straight line, while an ordinary ray $o_2$ is reflected almost perpendicularly to impinge on the light receiving unit 2, to form an image on a detector 22.

Consequently, also in the present embodiment, it is possible to prevent the light specularly reflected from the puddle W or the like from impinging on the light receiving unit 2.

Furthermore, when the polarization beam splitters are thus used, the arrangements of the light projecting unit and the light receiving unit can be changed by changing the direction in which the polarization beam splitters are located.

Figure 3:
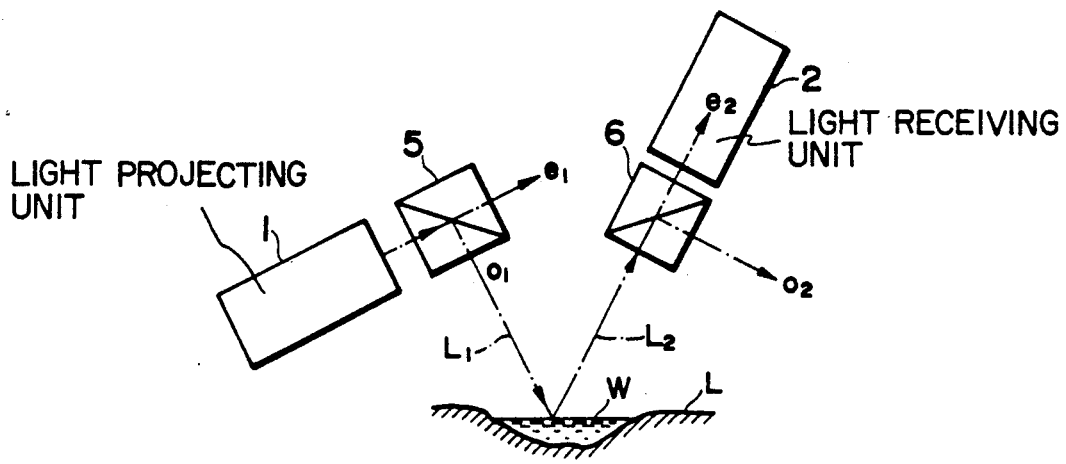
FIG. 3 is a diagram showing the arrangement and construction of still another embodiment.

More specifically, in FIG. 3, polarization beam splitters 5 and 6 are arranged with the directions of the optical axes of the crystals thereof coinciding with each other; Thus, light L1 emitted from a light projecting unit 1 is reflected from the polarization beam splitter 5 and projected into a road surface L; polarized light crossing at right angles to the polarized light emitted from the polarization beam splitter 5 is propagated in an almost straight line to impinge on a light receiving unit 2. That is, only an ordinary ray $o_1$ is reflected from the polarization beam splitter 5 to be projected into the road surface L. When the normal ray $o_1$ is specularly reflected from a puddle W to enter the polarization beam splitter 6 while maintaining the direction of polarization, the reflected light (ordinary ray $o_1$) is also reflected from the polarization beam splitter 6 as an ordinary ray $o_2$, and does not impinge on the light receiving unit 2. On the other hand, when the ordinary ray $o_1$ is reflected from the road surface L as natural light, the ordinary ray $o_2$ is reflected, while an extraordinary ray $e_2$ is propagated in an almost straight line to form an image in the light receiving unit 2.

Figures 4A, 4B:
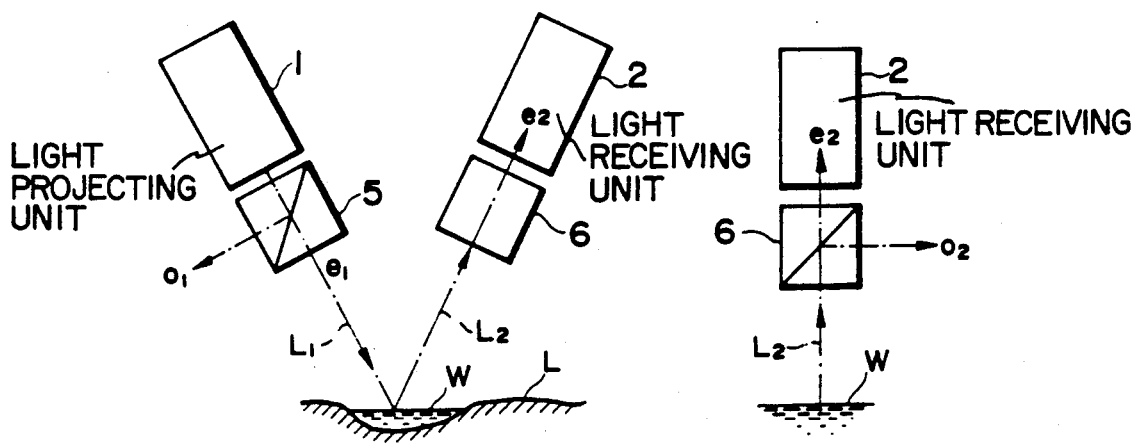
FIGS. 4a and 4b are respectively a front view and a side elevation view showing the arrangement and construction of a further embodiment.

Additionally, in FIGS. 4a and 4b, polarization beam splitters 5 and 6 are so arranged that the direction of the optical axis of the polarization beam splitter 6 is rotated through 90° with respect to the direction of the optical axis of the polarization beam splitter 5. Thus, light emitted from a light projecting unit 1 is propagated in an almost straight line from the polarization beam splitter 5 to be projected into a road surface L, and polarized light crossing at right angles to polarized light emitted from the polarization beam splitter 5 is propagated in an almost straight line to impinge on a light receiving unit 2. Therefore, only an extraordinary ray $e_1$ is propagated in an almost straight line from the polarization beam splitter 5 to be projected into the road surface L. When the extraordinary ray $e_1$ is specularly reflected from a puddle W to enter the polarization beam splitter 6 while maintaining the direction of polarization, the reflected light (extraordinary ray $e_1$) is reflected from the polarization beam splitter 6 as an ordinary ray $o_2$, and does not form an image in the light receiving unit 2. On the other hand, when the extraordinary ray $e_1$ is reflected from the road surface L as natural light, the ordinary ray $o_2$ is reflected, while an extraordinary ray $e_2$ is propagated in an almost straight line to form an image in the light receiving unit 2.

Meanwhile, the present invention can be constructed using various polarizers other than the above described polarizing plates and polarization beam splitters. In addition, different types of optical elements can be used as a polarizer and an analyser.

According to the present invention, even if a road surface is in a state where light is specularly reflected from a puddle or the like, the light specularly reflected from the puddle or the like can be prevented from impinging on the light receiving unit 2 so that only light reflected from the road surface forms an image, thereby making it possible to precisely measure the speed.

Consequently, under bad conditions such as rainy weather, the speed of an automobile or the like can be precisely measured using the spatial filter type speed measuring apparatus.

A semiconductor laser emits linearly polarized light. Consequently, if the semiconductor laser is used as a light source, the light projecting unit 1 need not be provided with the polarizing plate 3 or the polarization beam splitter 5, although it goes without saying that the light projecting unit 1 may be provided with the polarizers.

Additionally, it goes without saying that the polarizers can be arranged not only on the front surfaces of the light projecting unit 1 and the light receiving unit 2 but also the inside thereof.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A speed measuring apparatus comprising:
    a light projecting unit comprising a light source for emitting light, an optical projection system arranged to project a light from the light source onto a relatively moving object, and a first polarizer disposed in the optical projection system for allowing the passage of one polarized light component of the light from the light source as projected light;
    a light receiving unit comprising a second polarizer arranged to allow the passage of polarized light in a direction at right angles to the direction of polarization of the projected light reflected from the relatively moving object, and spatial filter means for taking out a predetermined spatial frequency component of the polarized light passed through the second polarizer and outputting an electrical signal representing the frequency component; and
    means for calculating the relative speed of the relatively moving object on the basis of the signal from the spatial filter means.

2. The speed measuring apparatus according to claim 1, wherein said first and second polarizers are polarizing plates.

3. The speed measuring apparatus according to claim 1, wherein said first and second polarizers are polarization beam splitters.

4. The speed measuring apparatus according to claim 1, wherein said light projecting unit and said light receiving unit are carried in a vehicle and the light from the light projecting unit is projected into a road surface, to measure a relative speed of the vehicle.

5. A speed measuring apparatus comprising:
    a light projecting unit comprising a light source for emitting linearly polarized light, and an optical projection system arranged to project a light from the light source onto a relatively moving object as projected light;
    a light receiving unit comprising a polarizer arranged to allow the passage of polarized light in a direction at right angles to the direction of polarization of the projected light reflected from the relatively moving object, and spatial filter means for outputting an electrical signal representing a predetermined spatial frequency component of the polarized light passed through the polarizer; and
    means for calculating the relative speed of the relatively moving object on the basis of the signal from the spatial filter means.

6. The speed measuring apparatus according to claim 5, wherein the light source is a semiconductor laser.

7. The speed measuring apparatus according to claim 5, wherein the light source comprised a second polarizer allowing the passage of predetermined polarized light.

8. The speed measuring apparatus according to claim 5, wherein the polarizer is a polarizing plate.

9. The speed measuring apparatus according to claim 5, wherein the polarizer is a polarization beam splitter.

10. The speed measuring apparatus according to claim 5, wherein said light projecting unit and said light receiving unit are carried in a vehicle and the light from the light projecting unit is projected into a road surface, to measure a relative speed of the vehicle.

* * * * *